United States Patent [19]

Angelico et al.

[11] Patent Number: 5,706,274
[45] Date of Patent: Jan. 6, 1998

[54] CSMA WITH DYNAMIC PERSISTENCE

[75] Inventors: Dean A. Angelico, Pleasanton; James A. Hayes, San Jose, both of Calif.

[73] Assignee: Tetherless Access Ltd. (TAL), Sunnyvale, Calif.

[21] Appl. No.: 525,239

[22] Filed: Sep. 7, 1995

[51] Int. Cl.$^6$ .................................................. H04L 12/413
[52] U.S. Cl. ......................................................... 370/85.3
[58] Field of Search ........................ 370/85.3, 85.2, 370/85.1, 85.13, 95.1; 340/825.5, 825.05, 825.08

[56] References Cited

U.S. PATENT DOCUMENTS

| | | | |
|---|---|---|---|
| 4,506,361 | 3/1985 | Kume | 370/85.2 |
| 4,979,168 | 12/1990 | Courtois et al. | 370/85.3 |
| 5,042,083 | 8/1991 | Ichikawa | 370/85.3 |
| 5,175,537 | 12/1992 | Jaffe et al. | 370/85.3 |
| 5,319,641 | 6/1994 | Fridrich et al. | 370/85.3 |
| 5,369,639 | 11/1994 | Kamerman et al. | 370/85.3 |
| 5,533,025 | 7/1996 | Fleek et al. | 370/85.2 |

OTHER PUBLICATIONS

"Link Level Protocols Revisited", Phil Karn et al., 1987.

*Primary Examiner*—Douglas W. Olms
*Assistant Examiner*—Chau T. Nguyen
*Attorney, Agent, or Firm*—Townsend and Townsend and Crew LLP

[57] ABSTRACT

A method and apparatus for dynamically determining the persistence value P at a node in a P-persistent CSMA wireless network by determining the number of nodes to which the given node has an established link and which have transmitted within a preceding period of time is provided. The preceding period of time is between 5–60 seconds, preferably approximately 10 seconds. The value of P is set to a value between $1/(0.5N+1)$ and $1/(2N+1)$, preferably approximately $1/(N+1)$.

18 Claims, 4 Drawing Sheets

FIG. 7

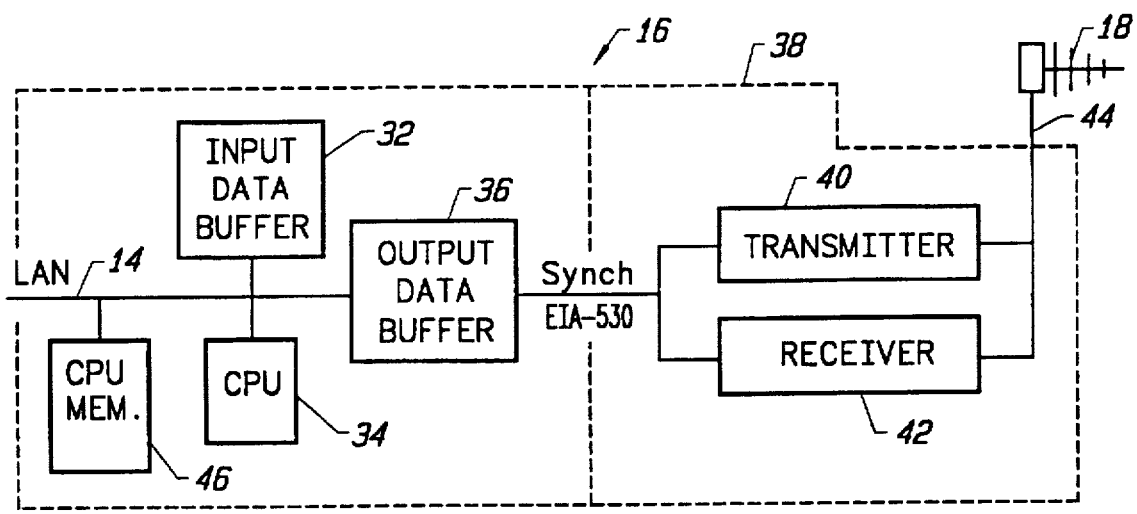
FIG. 4
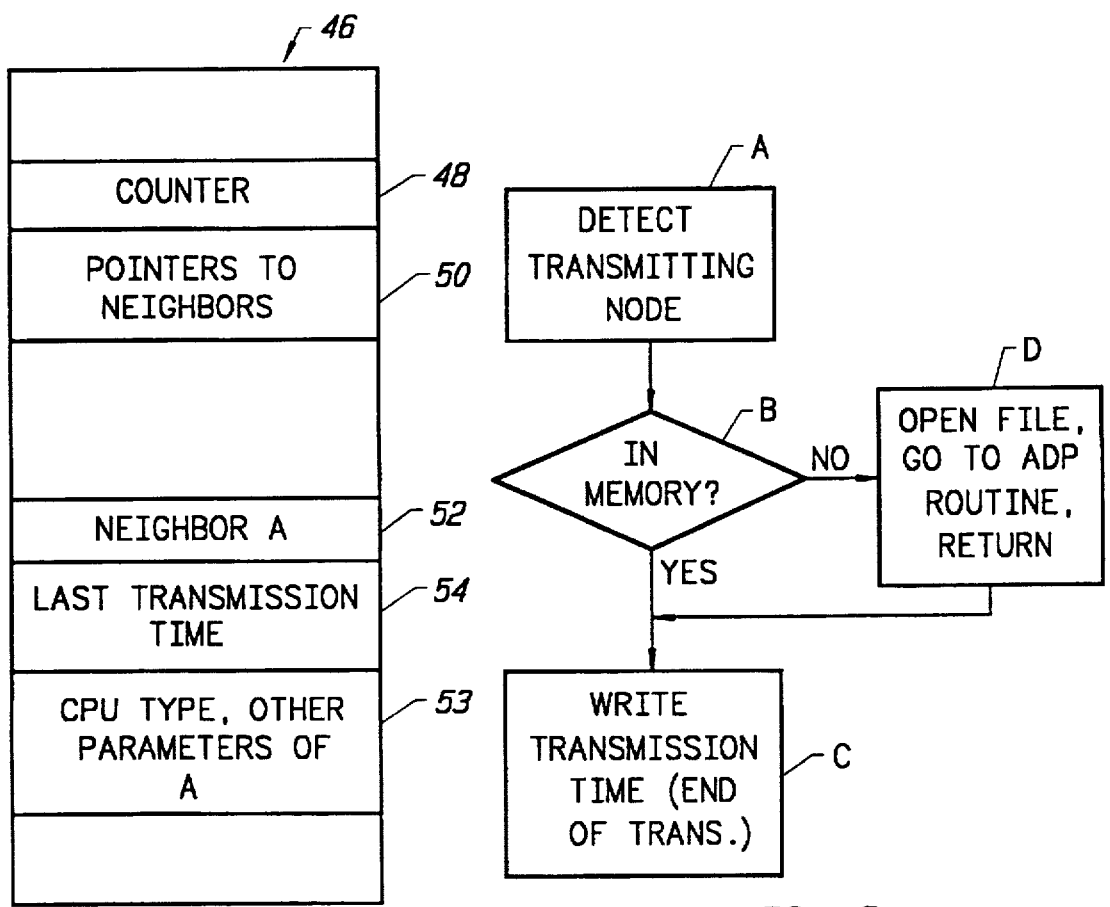
FIG. 5
FIG. 6

CSMA WITH DYNAMIC PERSISTENCE

BACKGROUND OF THE INVENTION

The present invention relates to determining a persistence value P for a P-persistent carrier sense multiple access (CSMA) wireless network, in particular a dynamic value of persistence (P).

There are a number of protocols for communication between computers at different nodes on a network. In one scheme, a centralized station can act as an arbitrator, and determine who has access to the network in response to requests received from individual network devices (nodes). In another scheme, the transmission medium can be divided into time slots, with each node being assigned a time slot. In yet another system, a token can be passed around the network, with a holder of the token having control of the network, thus offering a decentralized arbitration scheme.

Another popular method of network arbitration is a collision detection scheme. Each node accumulates data packets and waits for the shared channel to clear. In this method, each node will transmit when the channel is clear, and determine whether its transmission has collided with another node. If there is a collision, both nodes will back off for different times and try again. This type of system works well for a lightly loaded network, but as the network becomes more loaded, more sophisticated modifications are needed.

In one protocol, termed 1-persistent CSMA, any node transmits immediately if the channel is sensed idle. If the channel is sensed busy, each node waits until the channel becomes clear, and then transmission is done immediately. This type of system works well for a lightly loaded network, but can cause collisions in a more heavily loaded network due to the "jump on" problem, wherein multiple nodes attempt to transmit at the same time.

Another type of protocol, termed P-persistent CSMA, has each node that is ready to transmit generate a random number and compare it to a value "P". Both the random number and the value P are between zero and 1. The random number is generated so that random numbers will fall equally between 0 and 1, so that the probability of the random number being less than P is P, and the probability of the random number being greater than P is 1-P. If the random number generated by an individual station is less than P, the station transmits immediately. Otherwise, the station waits a small amount of time and repeats the procedure. The amount of time delayed is typically a "slot time", which is the amount of time required to determine whether another node has tried to transmit. Thus, this amount of time includes the propagation delay for a transmission. As can be seen, a value of P close to 1 will result in most nodes being able to transmit. Thus, for a lightly loaded network, choosing the value of P close to 1 makes sense. For a more heavily loaded network, the value of P should be lower. If P is chosen as 0.5, for instance, half of the nodes should generate a number less than P and half a number greater than P.

In an article entitled "Link Level Protocols Revisited" by Phil Karn and Brian Lloyd, the authors suggested that the persistence value for a wireless network should be set dynamically, if possible. The authors suggested a back-off algorithm can be viewed as a way to adjust the value of P dynamically, since doubling the retransmission interval corresponds to halving the value of P. The authors suggested a worthwhile research program would be the development of good algorithm for the real-time evaluation of P, and suggested that one possible approach would be to use a look-up table for determining the value of P based on an estimate of the channel activity.

The present invention is directed in particular to the field of wireless, or radio transmission, networks. Such networks are particularly useful where there is not an infrastructure of wired lines to allow interconnection of networks. A wireless network has particular issues that are not involved in a wired local area network. One issue is the difference in transmission power of the various nodes and the possibility for interference, such that it is possible that not all nodes can hear each other, depending upon the distance and geographical interference. In addition, it is possible for a first node to hear a second node, but not vice versa. Another unique feature of wireless networks is that collision detection is very difficult, due to the fact that any radio receiver integrated with a transmitter would hear only its local transmitter, not a remote one.

SUMMARY OF THE INVENTION

The present invention provides a method and apparatus for dynamically determining the persistence value P at a node in a wireless network by determining the number of nodes to which the given node has an established link and which have transmitted within a preceding period of time. The preceding period of time is between 5–60 seconds, preferably approximately 10 seconds. The value of P is set to a value between $1/(0.5N+1)$ and $1/(2N+1)$, preferably approximately $1/(N+1)$.

In accordance with a normal persistence algorithm, each node generates a random number and compares it to the value of P, backing off and retrying if its random number is greater than P, and going forward with the transmission if its random number is less than P. The back-off algorithm uses a slot time unique to a wireless network for which the invention is designed, using the sum of (a) a "turn-around" time corresponding to the time required to switch from receiving to transmitting or vice versa, (b) a one-way propagation delay time to a most distant node linked to the given node, and (c) a carrier detect time.

For a further understanding of the objects and advantages of the invention, reference should be made to the ensuing detailed description taken in conjunction with the accompanying drawings.

BRIEF DESCRIPTION OF THE DRAWINGS

FIG. 4 is a block diagram of a wireless router system;

FIG. 5 is a diagram illustrating the counters and data structures used by the present invention;

FIG. 6 is a flowchart illustrating the determination of established links and transmission times utilized by the present invention.

DESCRIPTION OF THE PREFERRED EMBODIMENT

Figure 1:
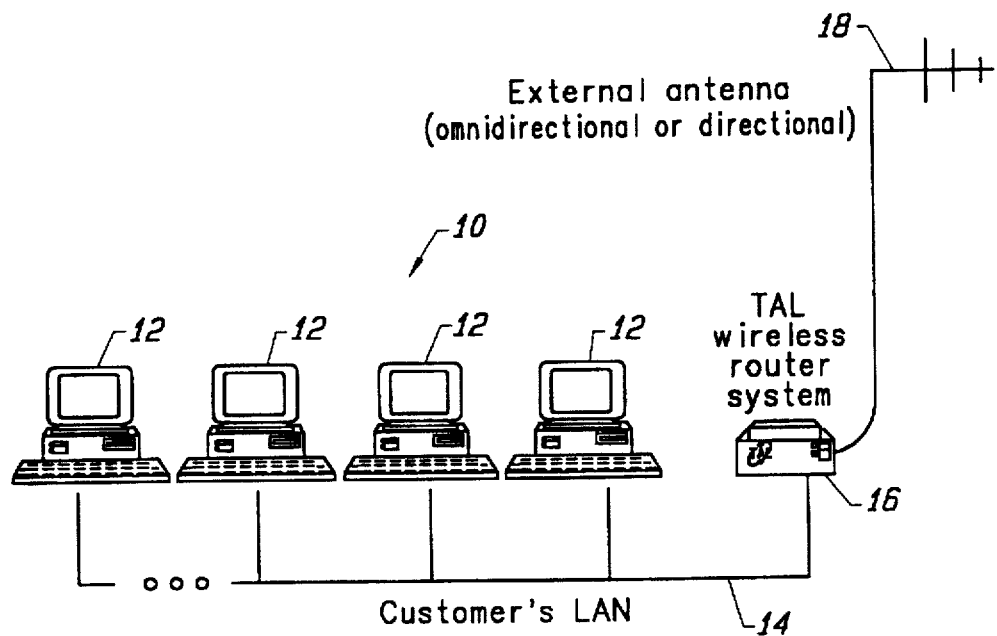
FIG. 1 is a block diagram of a LAN with a wireless router.

FIG. 1 illustrates a local area network 10 which has a number of individual computers 12 connected by a hard-wired bus 14 to a wireless router 16. The wireless router is connected to an external antenna 18 which may be omnidirectional or directional. The wireless router 16 is similar to a router used for wired networks, except that it also includes a radio for establishing a link with other routers. Other computers can also be connected to the LAN, or a single computer could be connected to a router 16 in alternate embodiments.

Figure 2:
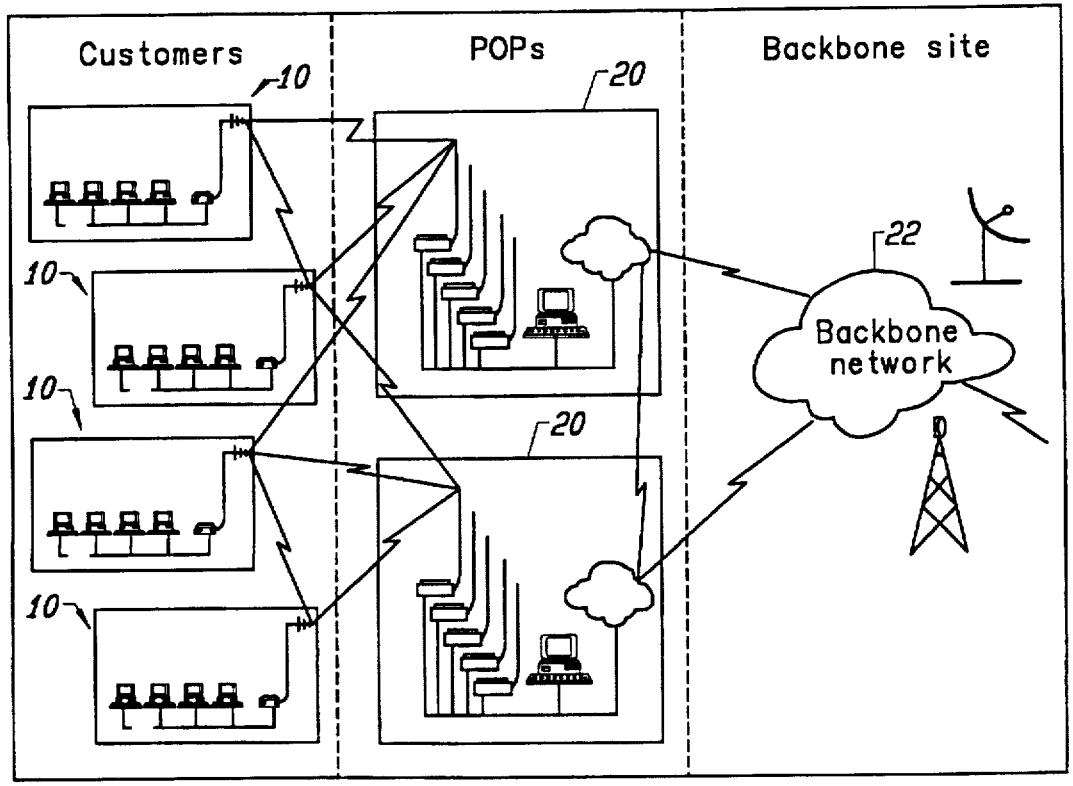
FIG. 2 is a diagram of a typical network including multiple LANs of FIG. 1.

FIG. 2 illustrates a wireless network having multiple LANs 10 at different customer sites. As illustrated, these LANs can connect via radio transmissions to other LANs 10, or to a point of presence (POP) 20. The POPs are access points to a wired internetwork, or the ultimate destination of traffic from the wireless network. The POPs are preferably distributed throughout a particular geographic area such that a wireless router need only propagate a message through a maximum of 3 hops between other wireless routers before reaching a POP. The POPs are connected to a backbone network 22 which provides a wide area network link.

Figure 3:
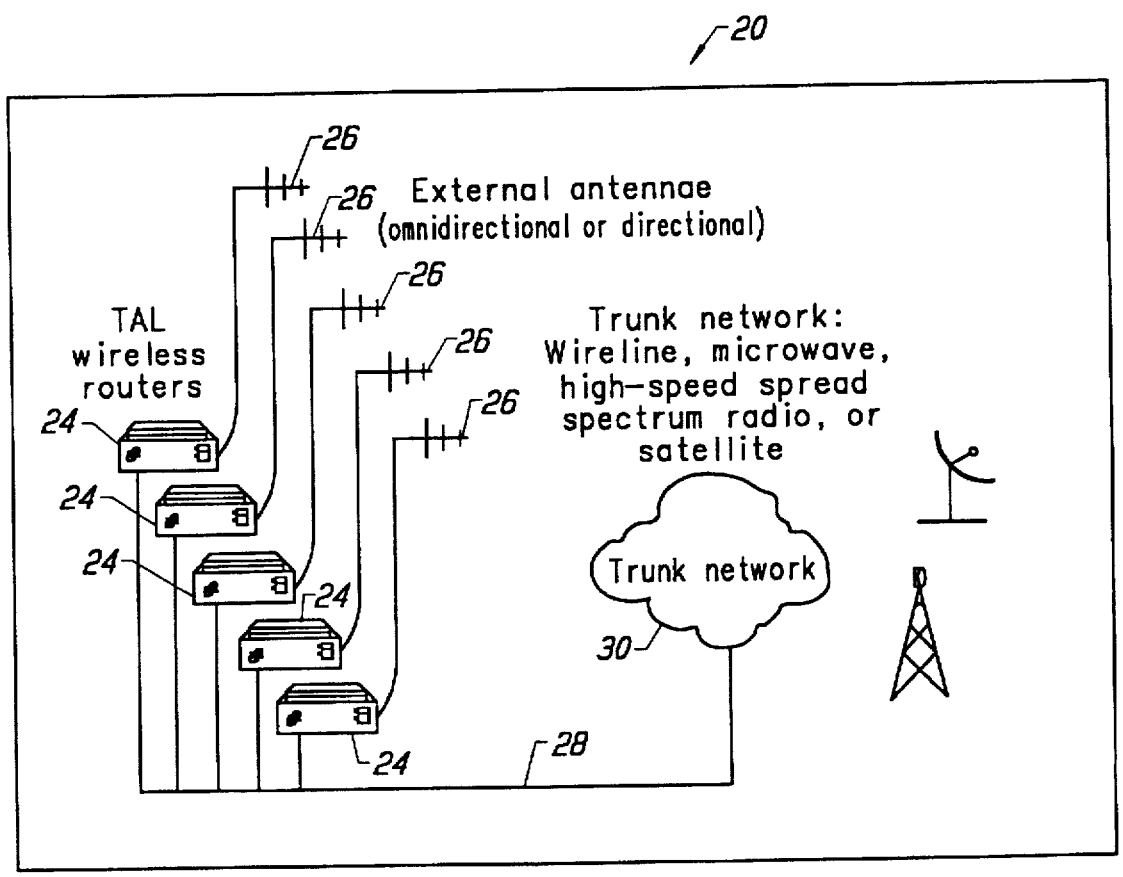
FIG. 3 is a more detailed drawing of the trunk network connection of FIG. 2.

As illustrated in more detail in FIG. 3, POP 20 includes a number of wireless routers 24 at a single station for receiving messages by their corresponding antennas 26. The wireless routers 24 are connected via a hard wire line 28 to the trunk network 30 which connects to the backbone network 22. The trunk network can be either a wire line, a microwave transmission medium, a high-speed spread spectrum radio, or a satellite link.

FIG. 4 is a block diagram of a wireless router 16 as shown in FIG. 1. As shown, the connection 14 to the LAN bus is provided to an input buffer memory 32 and the CPU 34. The CPU provides the data as it is to be transmitted through output buffer 36 to a radio portion 38 of the router, which includes a transmitter 40 and a receiver 42 linked to the output buffer by a synchronous EIA-530 link. The transmitter and receiver are connected by an RF cable 44 to antenna 18.

CPU 34 controls the operation of the router, and implements the algorithms of the present invention using data stored in a program memory 46. CPU 34 controls the flow of data to be transmitted, which is first received in buffer 32 and then transmitted out through buffer 36 to the radio 38 when the appropriate time for transmission is determined. In addition, received data provided through buffer 36 is routed by the CPU 34 to the appropriate computer on LAN 14.

When CPU 34 receives a packet of data to be transmitted in buffer 32, it will first determine the appropriate time for transmission. This is done by monitoring the wireless network for transmissions. In a preferred embodiment, the transmission is a spread-spectrum transmission. Alternately, assigned channels may be used, and the CPU may look at one assigned channel, or at several alternatives. If there is a transmission occurring on the channel of choice, the CPU will wait until an end of the transmission is detected.

When an end of the transmission is detected, the CPU will generate a random number between zero and 1 and compare that to its dynamically determined value of P. The value of P is determined as a number between $1/(0.5N+1)$ and $1/(2N+1)$. Preferably, P is set to $1/(N+1)$. N is determined as the number of nodes (a) to which there is a link to the given node in which CPU 34 is located, and (b) which have transmitted within a period of time immediately preceding of 5-60 seconds, preferably 10 seconds.

The value of N is determined using a software routine which analyzes data which has been continuously stored and updated in memory 46, as illustrated in FIG. 5. As shown, a count 48 of the neighbor's to which the given node has a link is maintained. Pointers to a location storing information about the neighbors are included in the memory at a location 50. In one example, a location 52 stores an identification of a number A, followed by a stored time of last transmission 54. Neighbor A will be listed if there is a link with that neighbor in which the given node can hear the neighbor, and the neighbor can hear the given node. The existence of such a link is determined by an ADP routine set forth in a copending application of the same assignee, entitled "ENHANCED ADJACENCY DETECTION PROTOCOL FOR WIRELESS APPLICATIONS", Ser. No. 08/526,130, filed Sep. 7, 1995. The routine set forth in that application determines by a handshaking mechanism whether there is a link with any neighbor which the given node hears generating a transmission and which has not previously been determined to be a link neighbor.

The counter 48 thus indicates the potential maximum value of N, with a determination of which of those N nodes have transmitted within the last 10 seconds next being needed to determine the actual value of N. This is done by comparing the current time to the time of last transmission in location 54 for each of the neighbor nodes. After that determination, the value of N to be used for the persistence formula can be generated.

FIG. 6 illustrates the program for determining a link neighbor and time of last transmission. In a first step A, a transmission is detected by the given nodes' radio. Next, it is determined whether that neighbor has already been determined to have a link (step B). If it has, the time of transmission is simply updated in the memory in step C. Otherwise, a data file is opened and the ADP routine is run to determine whether there is a link (step D). After the determination of a link, the time of transmission is noted (step C).

Figure 7:
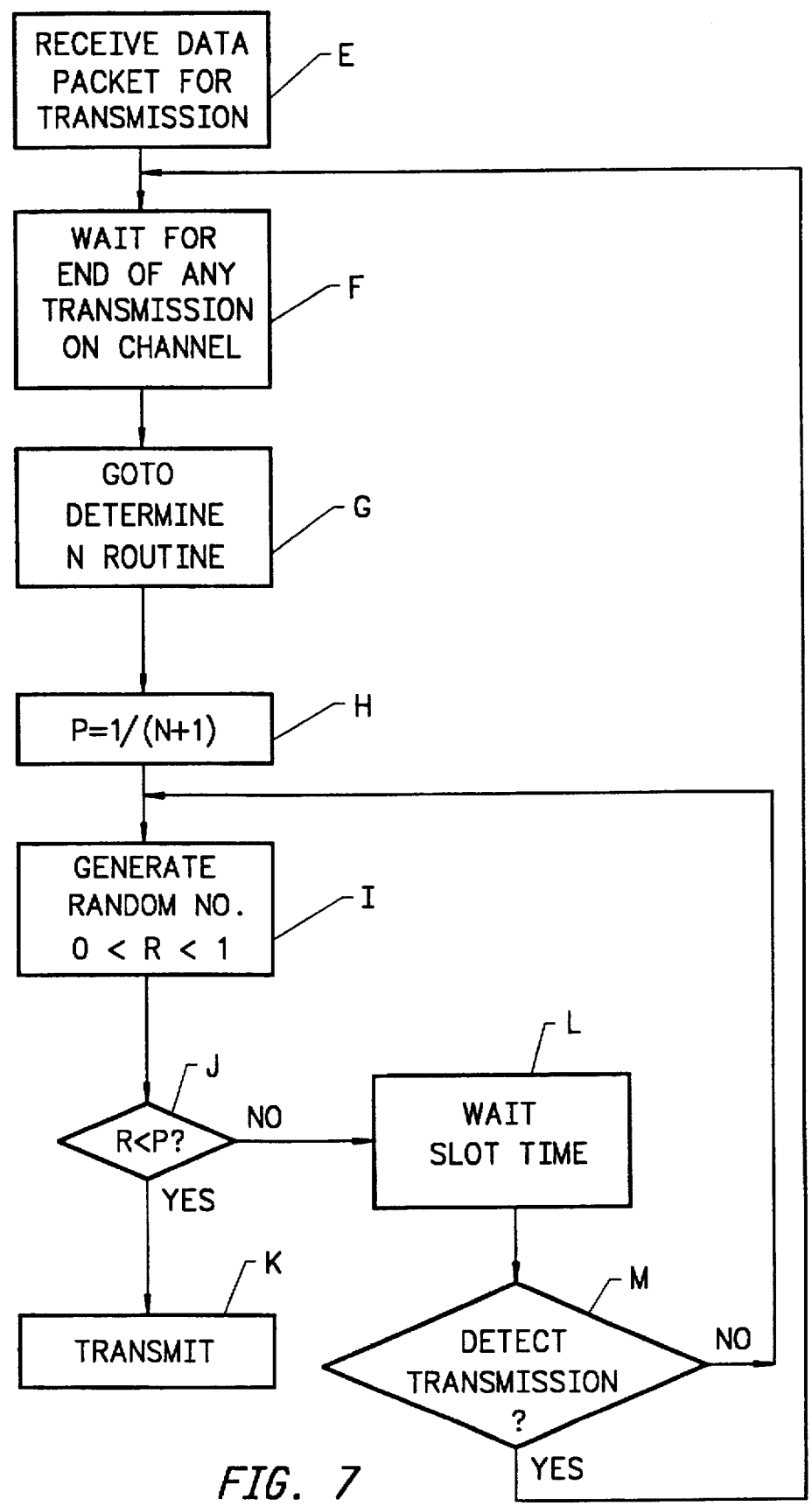
FIG. 7 is a flowchart illustrating the comparison to a persistence value for transmission according to the present invention.

FIG. 7 is a flowchart illustrating the process of determining when to transmit according to the present invention. In a first step E, a data packet for transmission is received by the wireless router. The router will determine whether there is any transmission on the wireless network, and if there is, wait until the transmission ends (step F). A routine will then be run to determine the value of N (step G). Actually, this routine may be constantly run, with N being constantly updated so that the new value is available when the transmission actually ends. Once N is determined, the value of persistence, P, is determined (step H). A random number R is then generated (step I) and compared to the value of P (step J).

If R is less than P, the transmission is initiated (step K). Otherwise, the router will wait one slot time (step L) and then determine if there is any transmission on the wireless network (step M). If no traffic is detected, the random number is generated again (Step I), and, using the same value of P and N, and the test for transmission is retried (Step J). If there is traffic, the node will wait for the transmission to end and then go through the routine again (step F).

The slot time value used is unique to the present invention in the embodiment which uses spread-spectrum radio broadcasts. The first component of the slot time is the radio turnaround time. This is the time for a node which is monitoring the network to switch from receiving to transmitting once it has determined that the network is available. In one embodiment, this amount of time is approximately 280 microseconds.

The next component of the slot time is the one way medium propagation delay. This is 5.3 microseconds per mile, with 10 miles being assumed to be the worst case for the present invention, thus giving 53 microseconds. Since this amount of time is much shorter than the other elements of the slot time, the worst case time is acceptable. However, it is possible in other embodiments to optimize the slot time on a per node basis to be the propagation delay time to the farthest node to which the particular node currently has an established link.

The third element of the slot time is the carrier sense time, the amount of time required to determine whether there is a transmission on the wireless network. This is approximately 800 microseconds in a preferred embodiment using a spread spectrum radio system. This time is affected by the power of the operating system in the router. In one embodiment, the ADP routine will determine the type of processor (fast or slow) used in other nodes. The carrier sense time can then be dynamically adjusted to the slowest router a given node is linked to. Thus, if all the routers with current links are fast, the carrier sense time may be reduced, reducing the overall slot time used. This data is stored at position 53 in memory 46 shown in FIG. 5. This gives a total slot time of 1.133 milliseconds. As can be seen, the propagation delay time, which is typically used as the slot time in a wired network, is dwarfed by the other factors, thus requiring a different approach in a wireless, radio network. By setting the propagation delay to a worst case, and using other times corresponding to the slowest piece of equipment in the network, the slot time should ensure that any other node transmitting should be detected, including "hidden" terminals which may be in a network range, but may be at a distance beyond the current longest link of which the particular node is aware.

Another factor in the timing is the amount of time required to run the software routine to determine the dynamic persistence value. Since this requires a fair number of calculations, it would not be optimum to constantly run this, and thus a minimum period of 5 seconds is used for determining relevant transmissions so that constant updating is not required. The maximum period of 60 seconds, or the optimum period of 10 seconds for considering recent transmissions, is used to give an indication of the likelihood that the last transmission was close enough that a new transmission may occur very shortly.

The limiting factor of determining whether there is a link to a node is also unique to the radio and wireless environment. If a node is detected by overhearing its transmission, but that node cannot hear a transmission by the given node, then there is no danger of a transmission by the given node interfering with the transmission by that overheard node. Accordingly, it is not taken into consideration when determining the value of persistence.

As will be understood by those familiar with the art, the present invention may be embodied in other specific forms without departing from the spirit or essential characteristics thereof. For example, a longer period of time, such as 20 seconds, or a shorter period, such as 5 seconds can be used for including transmitting nodes in the value of N. Different slot times could be used, such as any time between 0.8 and 5 milliseconds. The optimum formula for determining P could vary between a denominator of 2N+1 and 0.5N+1. The method of calculating P or N could be varied, using, for instance, hardware circuits rather than a software routine, or incrementing counters rather than calculating from the last time of transmission, etc. Accordingly, reference should be made to the appended claims which set forth the scope of the present invention.

What is claimed is:

1. A method for dynamically determining the persistence value P at a given node in a P-persistent CSMA wireless network, comprising the steps of:

monitoring communications over said wireless network;

determining a number N of nodes having transmitted within a preceding period of time prior to a request to transmit a given message at said given node;

setting P to a value between 1/(0.5N+1) and 1/(2N+1);

generating a random number at said given node;

comparing said random number to P; and transmitting said given message from said given node if said random number is less than P, otherwise delaying at least a delay period of time before transmitting.

2. The method of claim 1 further comprising the steps of:

transmitting to nodes on said wireless network to determine the existence of a two-way communication link;

determining a number X of said N nodes in said wireless network having a two-way communication link with said given node; and setting said number N to X for setting said value of P.

3. The method of claim 1 wherein said preceding period of time is between 5 and 60 seconds.

4. The method of claim 3 wherein said preceding period is approximately 10 seconds.

5. The method of claim 1 wherein said value of P is set to 1/(N+1).

6. The method of claim 1 wherein said delay period of time is a slot time, said slot time comprising:

a turn-around time equal to the longer of the time required for said node to switch from transmitting to receiving and the time required for said node to switch from receiving to transmitting, plus a one-way propagation delay between said given node and a most distant node determined to have a two-way communication link with said given node, plus a carrier detect time.

7. The method of claim 6 further comprising the step of varying said carrier detect time in accordance with the processing speed of said N nodes.

8. The method of claim 6 further comprising the step of adjusting said one-way propagation delay to a worst case value regardless of the distance of actual links.

9. A method for dynamically determining the persistence value P at a given node in a P-persistent CSMA wireless network, comprising the steps of:

monitoring communications over said wireless network;

transmitting to nodes on said wireless network to determine the existence of a two-way communication link;

determining a number X of said nodes in said wireless network having a two-way communication link with said given node;

determining a number of N of said X nodes having transmitted within a preceding period of time between 5 and 60 seconds prior to a request to transmit a given message at said given node;

setting P to a value between 1/(0.5N+1) and 1/(2N+1);

generating a random number at said given node;

comparing said random number to P; and transmitting said given message from said given node if said random number is less than P, otherwise delaying at least a delay period of time before transmitting.

10. The method of claim 9 wherein said value of P is set to 1/(N+1).

11. An apparatus for dynamically determining the persistence value P at a given node in a P-persistent CSMA wireless network, comprising:

means for monitoring communications over said wireless network;

means for determining a number of N of nodes having transmitted within a preceding period of time prior to a request to transmit a given message at said given node;

means for setting P to a value between $1/(0.5N+1)$ and $1/(2N+1)$;

means for generating a random number at said given node;

means for comparing said random number to P; and means for transmitting said given message from said given node if said random number is less than P, otherwise delaying at least a delay period of time before transmitting.

12. The apparatus of claim 11 further comprising:

means for transmitting to nodes on said wireless network to determine the existence of a two-way communication link;

means for determining a number X of said N nodes in said wireless network having a two-way communication link with said given node; and means for setting said number N to X for setting said value of P.

13. The apparatus of claim 12 wherein said preceding period of time is between 5 and 60 seconds.

14. The apparatus of claim 13 wherein said preceding period is approximately 10 seconds.

15. The apparatus of claim 11 wherein said value of P is set to $1/(N+1)$.

16. The apparatus of claim 11 wherein said delay period of time is a slot time, said slot time comprising:

a turn-around time equal to the longer of the time required for said node to switch from transmitting to receiving and the time required for said node to switch from receiving to transmitting, plus a one-way propagation delay between said given node and a most distant node determined to have a two-way communication link with said given node, plus a carrier detect time.

17. An apparatus for dynamically determining the persistence value P at a given node in a P-persistent CSMA wireless network, comprising:

means for monitoring communications over said wireless network;

means for transmitting to nodes on said wireless network to determine the existence of a two-way communication link;

means for determining a number X of said nodes in said wireless network having a two-way communication link with said given node;

means for determining a number of N of said X nodes having transmitted within a preceding period of time between 5 and 60 seconds prior to a request to transmit a given message at said given node;

means for setting P to a value between $1/(0.5N+1)$ and $1/(2N+1)$;

means for generating a random number at said given node;

means for comparing said random number to P; and means for transmitting said given message from said given node if said random number is less than P, otherwise delaying at least a delay period of time before transmitting.

18. The apparatus of claim 17 wherein said value of P is set to $1/(N+1)$.

* * * * *